United States Patent
Jang

(10) Patent No.: US 7,522,240 B1
(45) Date of Patent: Apr. 21, 2009

(54) LIQUID CRYSTAL DISPLAY HAVING IMPROVED RETARDATION FILM

(75) Inventor: Yong-Kyu Jang, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/576,129

(22) Filed: May 22, 2000

(30) Foreign Application Priority Data

May 28, 1999 (KR) ................................. 99-019456

(51) Int. Cl.
*G02F 1/1335* (2006.01)

(52) U.S. Cl. .................... 349/119; 349/102; 349/114

(58) Field of Classification Search ........... 349/96–103, 349/114, 117–119
See application file for complete search history.

(56) References Cited

U.S. PATENT DOCUMENTS

| | | | |
|---|---|---|---|
| 5,249,071 A * | 9/1993 | Yoshimizu et al. | 349/102 |
| 6,195,140 B1 * | 2/2001 | Kubo et al. | 349/44 |
| 6,204,904 B1 * | 3/2001 | Tillin et al. | 349/119 |
| 6,341,002 B1 * | 1/2002 | Shimizu et al. | 349/119 |

FOREIGN PATENT DOCUMENTS

| | | |
|---|---|---|
| JP | 06-265875 | 9/1994 |
| JP | 08-194204 | 7/1996 |
| JP | 08-262434 | 10/1996 |
| JP | 10-227998 | 8/1998 |
| KR | 1998-067805 | 10/1998 |

* cited by examiner

*Primary Examiner*—Dung T. Nguyen
(74) *Attorney, Agent, or Firm*—F. Chau & Assoc., LLC

(57) ABSTRACT

A liquid crystal display having improved retardation plate is described. In the liquid crystal display, at least one of two panel plates has a polarizer placed on an outer side which is opposite to a liquid crystal layer and a quarter wavelength retardation plate between a substrate glass and the polarizer. The quarter wavelength retardation plate is composed of two retardation films including a half wavelength and a quarter wavelength retardation film. A slow axis of a half $\lambda$ film which is adjacent to the polarizer makes an angle of $\Theta1$ with a transmissive axis of the polarizer and that of a quarter $\lambda$ film which is adjacent to the substrate glass makes an angle of $\Theta2$ where $\Theta2=2\times\Theta1\pm45$ degree. The retardation films are single-axial films. The specific angle $\Theta1$ is one of degree values (15, 75, 105, and 165). In a transmissive type liquid crystal display, a structure of the other panel plate is similar to that of one panel plate and combination to the values ($\Theta1$, $\Theta2$, $\Theta3$, $\Theta4$) is one selected from the group consisting of combinations (15, 75, 165, 105), (75,15,105,165), (105,165,75,15), and (165,105,15,75).

10 Claims, 9 Drawing Sheets

LIQUID CRYSTAL DISPLAY HAVING IMPROVED RETARDATION FILM

FIELD OF THE INVENTION

The present invention is related to liquid crystal displays and, more particularly, liquid crystal displays having retardation film arrangement which can exactly be operated in a wide range of visible light.

BACKGROUND OF THE INVENTION

In a display market, a liquid crystal display rapidly has enlarged its territory and replaced CRT because it has some merits (better properties) such as low power consumption, small size especially in thickness, and lightness.

Referring to the early stage products of a liquid crystal display, a reflection type was the most common type. So the external light source to light the display panel was required. However, the reflection type liquid crystal displays of the early stage hardly meet the requirement for high quality, multi-media display in the respects of correspondence time, color appearance, efficiency of reflection, and contrast ratio.

Research and development on the other types of liquid crystal display such as PCGH (Phase Change Guest Host) type, PDLC (Polymer Dispersed Liquid Crystal) type, PSCT (Polymer Stabilized Cholesteric Texture) type are also done. However, they have other types of problems such as high operation voltage and difficulties in gray scale display.

In comparison with above-mentioned types of a liquid crystal display, the MTN (Mixed Twisted Nematic) mode which is being developed nowadays has its own strong point in productivity and in reliability. Further, the MTN mode has merits in reflection efficiency, contrast ratio, and color appearance. The MTN mode is a kind of TN mode having retardation film to compensate for phase difference caused by liquid crystal layer in the path of light.

But, in the present Window environment, normally dark MTN mode causes increase in power consumption and lacks of cell gap uniformity. Moreover, according to the optical property of LC, if a wave length of light goes further to an infrared region, the more the intensity of light in dark mood increases. The increase of light intensity in dark mode worsens the contrast ratio of a liquid crystal display.

To solve such a problem in the MTN mode, the method of differentiating cell gap of pixel to the color RGB (Red, Green, Blue) can be considered. But, it is hard to make a liquid crystal display panel having pixels of different cell gap in the color.

Therefore, another method is usually adopted, which uses a retardation film to operate a liquid crystal display in a normal white mode.

FIG. 1 shows a basic structure of a panel substrate in an MTN mode reflection type liquid crystal display and optical bases of normal white mood operation in the liquid crystal display. In FIG. 1 and hereinafter, the electrodes applying an electric field to a liquid crystal layer are omitted.

By these figures, relationship of composing elements in the structure of a liquid crystal display and phase change of light passing through the elements can explicitly be shown.

Let a vertical line in the FIG. 2 be a z-axis, a horizontal line an x-axis. At this time, a line perpendicular to the figure plane is a y-axis. The incident light having the direction of a positive z-axis (i.e., downward in the figure) is not polarized so that the incident light can vibrate in all directions of the x-y plane.

First, in case of a white mode, the light incident on the panel is transformed to lineally polarized light by a polarizer 11 which is generally attached to a surface of a front (upper) substrate glass. The polarized light vibrates in the x-direction that is the direction of a transmissive axis of the polarizer 11.

The slow axis of a retardation plate 13 makes angle of −45' in view of clockwise circulation with the transmissive axis of the polarizer 11. So the lineally polarized light is changed into circularly polarized light which circulates counter clockwise by passing through the retardation plate 13. If there is no electric field in a liquid crystal layer 19, the liquid crystal layer 19 is twisted. Generally, the angle is 90 and corresponds to one-forth of the wavelength of a passing light in an MTN mood liquid crystal display. The circularly polarized light passing through the liquid crystal layer 19 is changed into lineally polarized light again. At this time, however, the lineally polarized light vibrates only in y-axis direction.

Then, the light is reflected on a reflector 41 placed on the inner surface of a rear (lower) substrate glass. In the reflection, phase shift of the lineally polarized light corresponds to double of right angle and thus maintains the y-axis vibration, practically the same state.

The reflected light passes through the liquid crystal layer 19 and the retardation plate 13 again. The phase of the reflected light is reversely changed, so that the reflected light is circularly polarized light rotating counter-clockwise and is lineally polarized light vibrating only in an x-axis direction then. The polarized light vibrates in the x-direction that is the direction of the transmissive axis of the polarizer 11. As a result, the reflected light finally passes the polarizer 11 without serious decrease in intensity.

If a panel of liquid crystal display is operated in this mode, the liquid crystal display panel looks bright when no electric potential is applied to the liquid crystal layer. So this type of a liquid crystal display has merits in view of less electric energy consumption in a normal white windows operation system. In a color type liquid crystal display possessing color filter, although the light passing each pixel of the color filter shall have its own color, the total effect of the light passing through some broad area of the color filter is represented by white color, substantially the same to black-white type.

Next, in case of a dark mode, incident light to the liquid crystal display panel goes through the same pass with same phase change before the light reaches the liquid crystal layer 19. When the light reaches the liquid crystal layer 19, the light is circularly polarized and the liquid crystal molecules are arrayed in parallel and upright because of the applied electric field. Thus, circularly polarized light undergoes no phase shift in the proceeding and maintains the same phase state.

Then, the circularly polarized light is reflected at the reflector 41 placed on the inner surface of the lower substrate glass. By the reflection, the phase shift of the light makes the reflected light be orthogonal to the incident light to the reflector 41. The reflected light now becomes circularly polarized light circulating clockwise, passes the liquid crystal with no phase shift, and reaches the retardation plate 13.

The retardation plate makes the circularly polarized light be polarized light vibrating toward only y-axis which is perpendicular to the direction of the transmissive axis of the polarizer 11. As a result, the reflected light hardly passes the polarizer.

If a liquid crystal display panel is operated in this mode, the panel looks dark in the state of applied potential.

In the above description, it is expected that a retardation film serves as an ideal λ/4 plate to all the range of visible light (380 nm-780 nm). However, all of the real materials in retardation film almost have wavelength dispersion characteristics, as shown in FIG. 2. Therefore, a value of delta nd becomes smaller to light of farther infrared region. If the retardation plate is designed to accurately serve as visible light of middle-ranged wavelength, for the light of shorter wavelength in a visible region, the intensity of reflected light is strengthened in dark mode. A retardation film of one sheet cannot make an ideal λ/4 plate to the whole range of visible light. In reflection type liquid crystal display, according to the wavelength dispersion character, some part of incident light re-penetrates the polarizer and goes from the liquid crystal display panel after polarization and reflection. Further, the penetrated light cuts contrast ratio of a liquid crystal display and degrades quality of the liquid crystal display.

SUMMARY OF THE INVENTION

It is therefore one feature of the invention to provide a liquid crystal display having an improved retardation film capable of preventing decrease in contrast ratio to whole range of visible light.

It is another feature of the invention to provide a liquid crystal display having an improved retardation film capable of minimizing display brightness owing to liquid crystal characteristics in a dark mode.

For those purpose, the present invention proposes a liquid crystal display comprising at least one substrate glass where a retardation plate placed between the substrate glass and a polarizer. The retardation plate is composed of two element retardation films. In one of them, a half lambda retardation film, delta nd, is equal to a half of the wavelength of specific light. In the other, a quarter of the lambda retardation film, delta nd, is equal to the one forth of the wavelength of the specific light. The slow axes of the retardation films make particular angles with the transmissive axis of the polarizer.

Each thickness of the element retardation films is decided by the specific wavelength of the light and the specific material of which the films are made. Preferably, of the two element retardation films, a half of the lambda plate is adjacent to the polarizer. Let a first angle between a transmissive axis of the polarizer and a slow axis of the half lambda plate be $\Theta 1$, let $\Theta 2$ be a second angle between the transmissive axis of the polarizer and the slow axis of quarter lambda plate. In this case, 2 is chosen by the relation equation $\Theta 2=2\times\Theta 1\pm 45°$.

As the light axis of light penetrating a retardation film rotates two times of an initial angle between the transmissive axis of polarizer and the slow axis of retardation film, the light axis initially make a cross angle of 45° with the slow axis of the quarter lambda plate and the light makes circularly polarized light.

The specific value of $\Theta 1$ and $\Theta 2$, where the intensity of the light measured at the front of a liquid crystal display panel in a dark mode has a minimum value, may be acquired by simulation or actual experiment.

The value of $\Theta 1$ and $\Theta 2$ may be more than one, and some of them are degenerated. In light of wavelength 5500 Å, the independent value pairs for the specific angles are as follows: $\Theta 1=15$ and $\Theta 2=75$; $\Theta 1=75$ and $\Theta 2=195$; $\Theta 1=105$ and $\Theta 2=165$; and $\Theta 1=165$ and $\Theta 2=285$. The difference of value smaller than 5 degree from the above critical values will not make a significant difference in effect.

Applied to the reflection type liquid crystal display where a retardation film is placed on one panel glass and a reflector is placed on the other, the invention is also applied to a transmission type liquid crystal display. In a transmission type liquid crystal display, the retardation films are placed on an outer side of two panel glasses of a liquid crystal display. It is preferable that each arrangement of a glass, a polarizer, and element retardation films is symmetric, and each angle out of the transmissive axis and the slow axes of the element retardation films may be conserved in case of turnover.

Referring to a reflection type liquid crystal display, a proper cross angle between the transmissive axis of the polarizer and the slow axis of the half lambda plate may be obtained by experiment or computer simulation.

Referring more to a transmission type liquid crystal display, a quarter lambda plate, a half lambda plate, and a polarizer are attached to an the outer side of the two glasses of an liquid crystal display panel. The relation equation $\Theta 2=2\times \Theta 1\pm 45°$ is also applied thereto and the half lambda plate and the quarter lambda plate combined play a role in one quarter lambda plate which transforms linearly polarized light to circularly polarized light.

If incident light on an upper panel glass is to be clockwise circularly polarized, the lower panel glass should be arranged so that the incident light on the outer side of the lower panel may be clockwise or counter clockwise circularly polarized. If thickness of the liquid crystal layer corresponds to a quarter lambda or a half lambda, an angle between the two polarizers has a preferable range of 0°-90° so that light intensity can be minimized in a dark mode of a liquid crystal display. The half lambda plate and the quarter lambda plate of an upper panel glass should have optical characteristics same as the half lambda plate and quarter lambda plate of lower panel glass.

In the invention, all the angles are measured clockwise with the viewing direction from a polarizer to retardation films in each substrate glass.

BRIEF DESCRIPTION OF THE DRAWINGS

The other objects, features and advantages of the present invention will become apparent from the following description taken in conjunction with the accompanying drawings, in which.

DETAILED DESCRIPTION OF THE PREFERRED EMBODIMENT

The preferred embodiments of the invention will now be described more fully hereinafter with reference to accompanying drawings.

Embodiment 1

Figure 1:
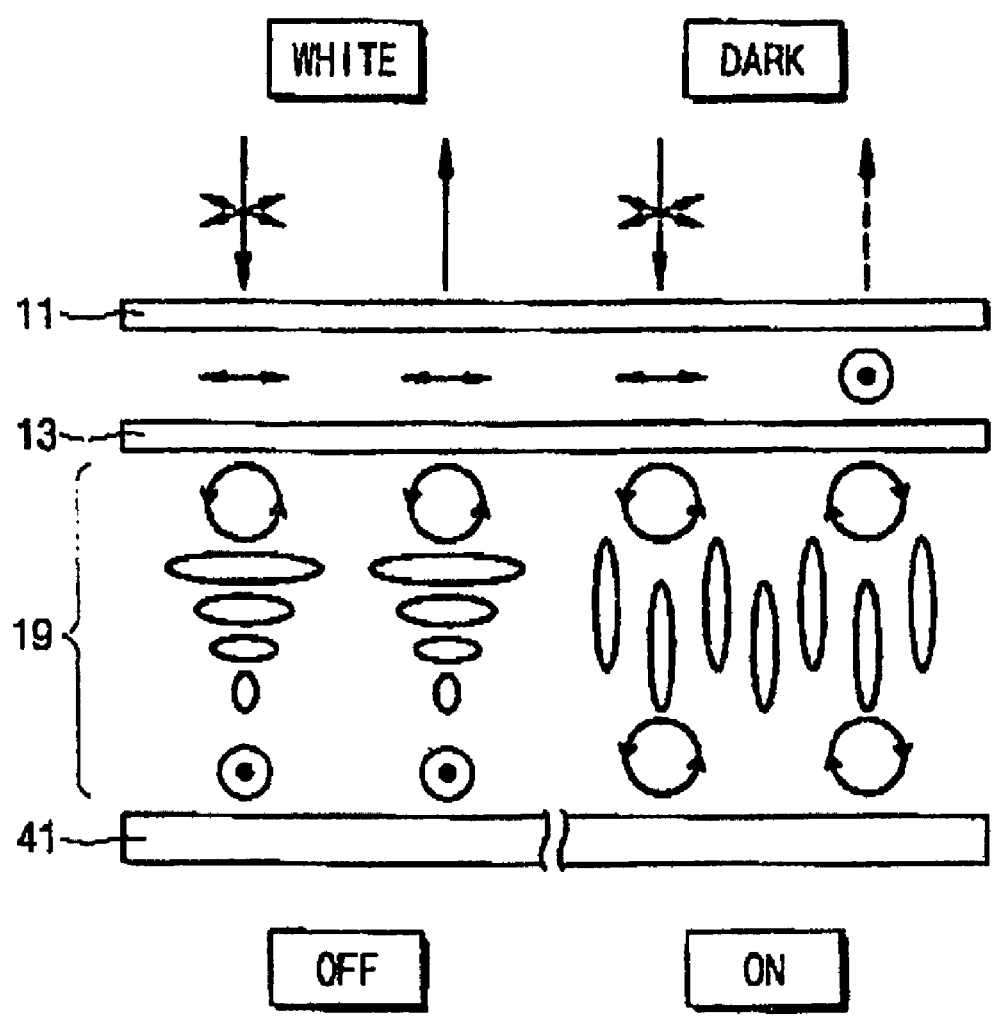
FIG. 1 shows a basic structure of a panel substrate in an MTN mode reflection type liquid crystal display and optical bases of a normal white mode operation in the liquid crystal display.
Figure 2:
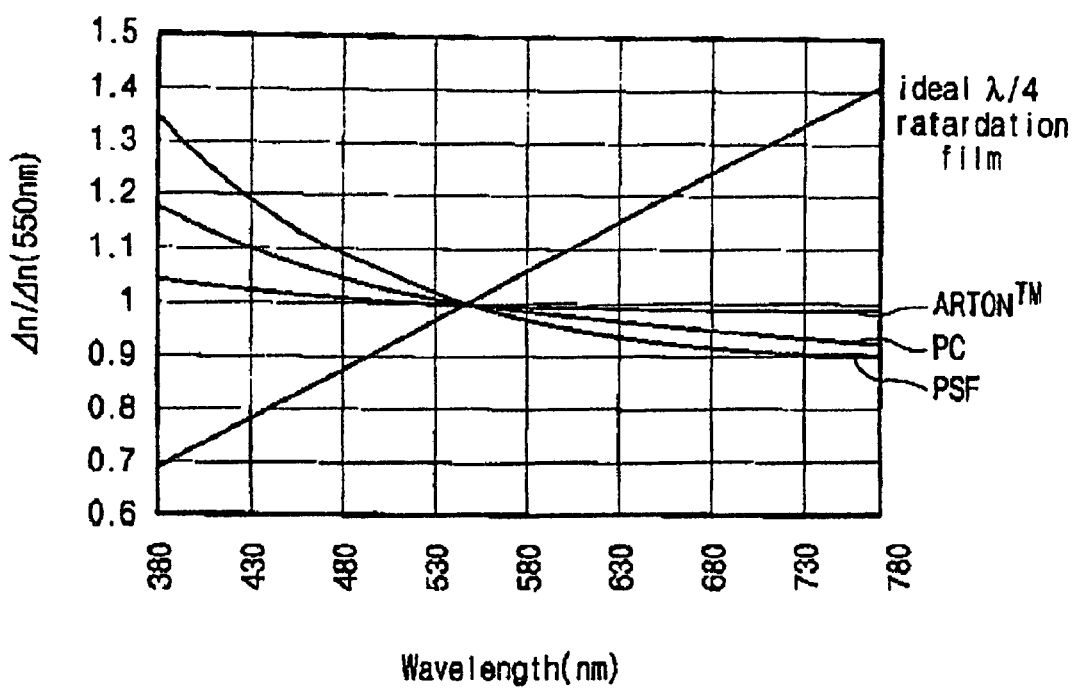
FIG. 2 is a graph showing wavelength dispersion characteristics in a wavelength range of visible light to some materials of a retardation film.
Figure 3:
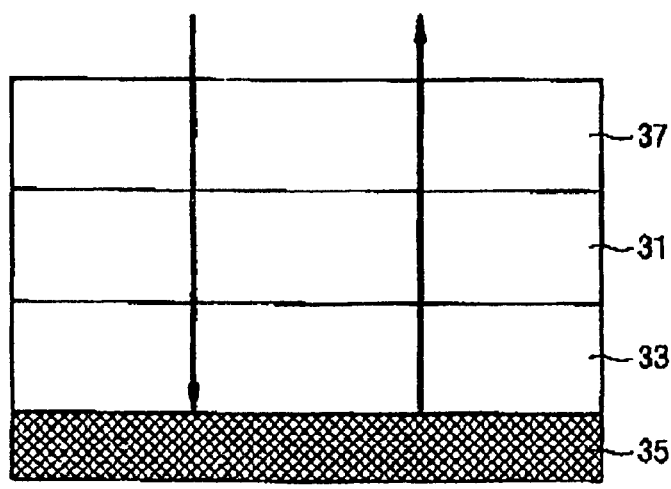
FIG. 3 shows a characteristic structure of an optical apparatus designed for obtaining result of the invention and deciding a proper angle.
Figure 4:
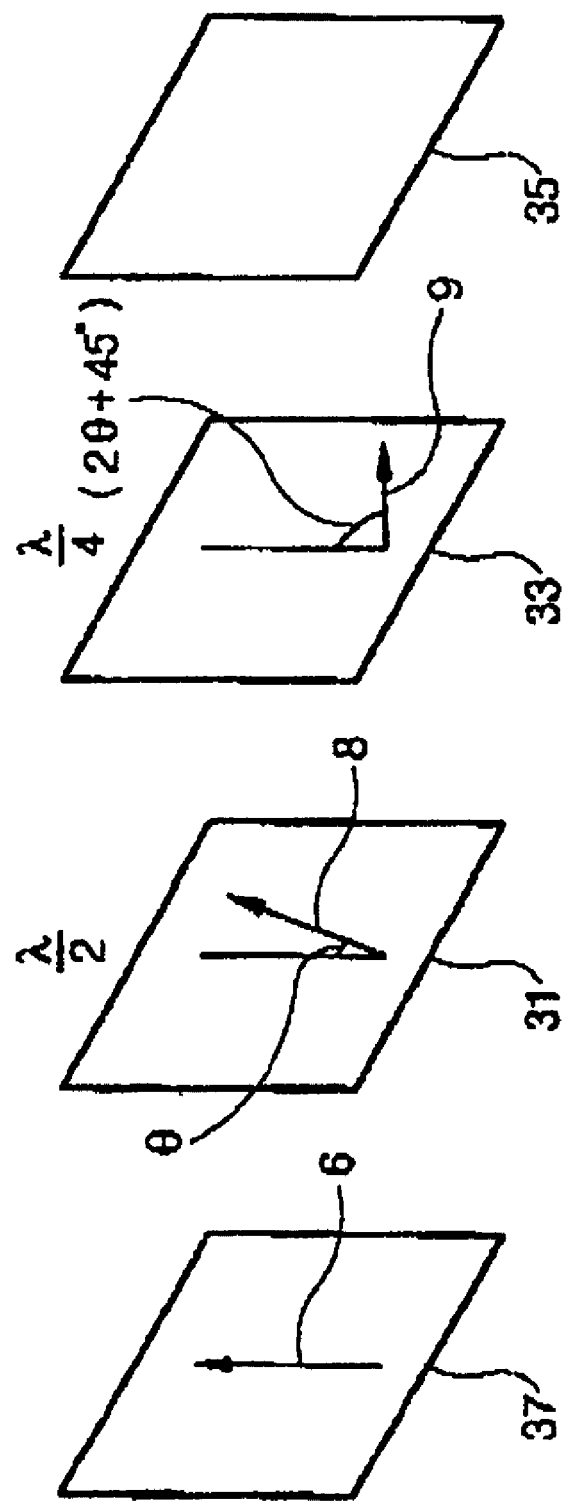
FIG. 4 is a descriptive view showing relationship of an axis of an element layer composing the apparatus shown in FIG. 3.

FIG. 3 shows a characteristic structure of an optical apparatus designed for obtaining result of the invention and deciding the proper angle, and FIG. 4 is a descriptive view showing relationship of an axis of an element layer composing the apparatus shown in FIG. 3.

In the apparatus, a polarizer 37, a half lambda retardation film 31, a quarter lambda retardation film 33 and reflector 35 are sequentially attached without a space. For an experiment, the retardation films rotate gradually clockwise by relation equation $\Theta2=2\times\Theta1\pm145°$. Intensity to the reflected light is measured. At the proper angles, 1 and $\Theta2$, the intensity of the reflected light has a minimum value.

With regard to the proceeding of light in the optical apparatus, proper angles are $\Theta1$ and $\Theta2$. The incident light is polarized and, circularly polarized and reflected. In the reflection, clockwise circularly polarized light is transformed to counterclockwise circularly polarized light. The circularly polarized light is then transformed to linearly polarized light which is orthogonal to the transmissive axis of the polarizer and shielded by the polarizer.

Because it is impossible for one retardation film to make a phase change corresponding to ¼ wavelength for a whole range of visible light, the retardation film is made of two element retardation films. Referring to FIG. 4, the element retardation films should be single-axial films and the angles between the transmissive axis 6 of the polarizer 37 and the slow axes 8 and 9 of the retardation films 33 and 31 should be met by the predetermined relation, $\Theta2=2\times\Theta1\pm45°$. In case that the two element retardation films 31 and 33 are combined with a certain axis angle, by the compensative co-action of the element retardation films 31 and 33, the combined retardation films may serve as an ideal quarter lambda retardation plate for some range of visible light.

In the retardation plate composed of one and more element retardation film, as the light proceeds in the retardation film, the direction of the optical axis of light itself changes. Therefore, difference of a light path (delta nd) in one of the element retardation films is not meaningful, and total difference of light path of the whole retardation films should be considered.

In the ideal retardation film, effective light path difference is ¼ of wavelength to the whole range of visible light, a dark state is accomplished and there is no reflected light in a pixel of a liquid crystal display.

In the optical apparatus, intensity of reflected light is proportional to the difference of effective delta nd of the retardation film and a quarter of wavelength. So, by the measure of the intensity of the reflected light, the proper angle among the slow axes and the transmissive axis can be obtained in the apparatus. Specifically, the actual measure to the intensity of reflected light is accomplished by measuring relative light intensity as proportion to the light from a surface of $BaSO_4$.

The proper angle can be obtained by simulation. The simulation result may be acquired by matching proper Jones Matrix with each of the optical elements (i.e., liquid crystal, half and quarter lambda plates, and a polarizer), and the intensity may be calculated by applying the Jones Matrixes to the unit element of the initial light. Through a computer program including the matrix equation, of course, the calculation may be done well.

The value of $\Theta1$ and $\Theta2$ may be more than one, and some of them are degenerated. For light of wavelength 5500 Å, an independent value pairs for specific angles are as follows: $\Theta1=15$ and $\Theta2=75$, $\Theta1=75$ and $\Theta2=195$, $\Theta1=105$ and $\Theta2=165$, $\Theta1=165$ and $\Theta2=285$. Further, difference of a value smaller than 5 degree from the above critical values will not make a significant difference in effect.

Theoretical characteristic of a retardation film is evaluated by delta dn, the actual dispersion characteristic of the retardation film to the light of various wavelengths is closely related with the material and the method of fabrication.

ARTON of Japan Synthetic Rubber CO. and an elongated polycarbonate film may be the ¼ lambda retardation film for most of the visible light.

Figure 5:
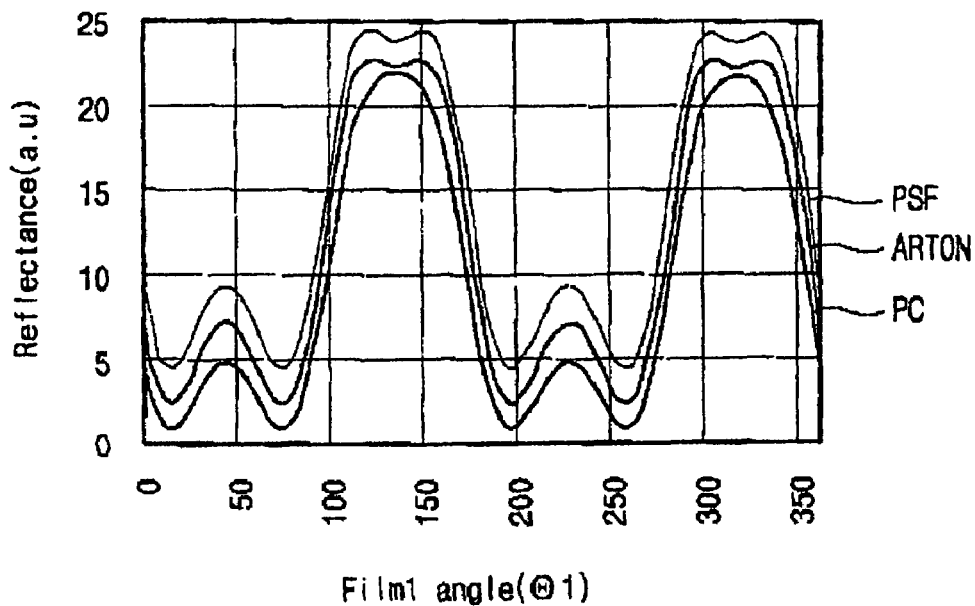
FIG. 5 and FIG. 6 show change of reflection ratio in accordance with change of $\Theta 1$ and $\Theta 2$, and values of reflection ratio acquired by computer simulation.
Figure 6:
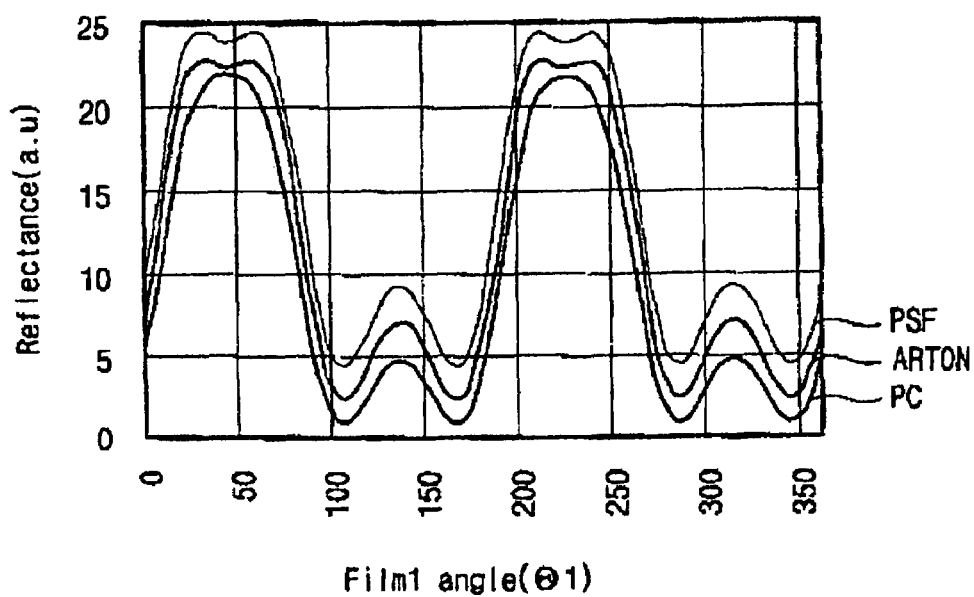

FIG. 5 and FIG. 6 shows change of reflection ratio in accordance with change of $\Theta1$ and $\Theta2$. Values of the reflection ratio are acquired by computer simulation. In FIG. 4, $\Theta1$ and $\Theta2$ are decided by the relation equation $\Theta2=2\times\Theta1+45°$. In FIG. 5, $\Theta1$ and $\Theta2$ are decided by the relation equation $\Theta2=2\times\Theta145°$. Considering the result, though a perfect dark state is not accomplished, the actual values of $\Theta1$ and $\Theta2$ corresponding to the effective dark state are acquired. The result may be summarized as the following "TABLE 1".

TABLE 1

| Δnd for wavelength 5500Å | | Combination 1 | Combination 2 | Combination 3 | Combination 4 |
|---|---|---|---|---|---|
| $\Theta1$ | λ/2 | 15° | 75° | 105° | 165° |
| $\Theta2$ | λ/4 | 75° | 195° | 165° | 285° |

In comparison with some materials shown in FIG. 5 and FIG. 6, the ARTON and PVA are relatively proper for an ideal retardation film in view of low reflection ratio at the specific $\Theta1$ and $\Theta2$ conditions.

Figure 7:
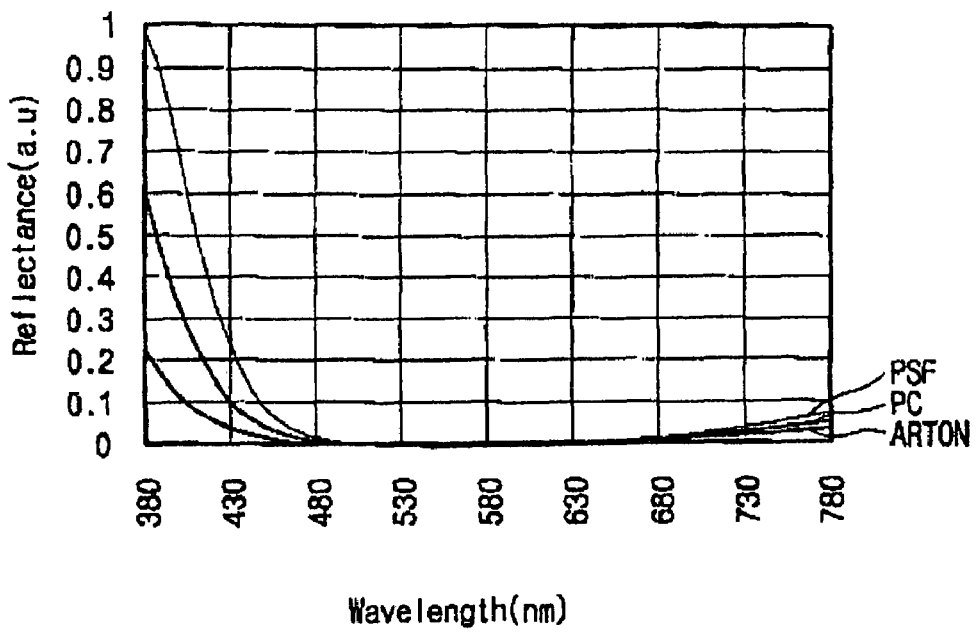
FIG. 7 shows change of reflection ratio in accordance with wavelength change of light on condition that $\Theta 1$ is 15 and $\Theta 2$ is 75, similar to the optical apparatus shown in FIG. 3.

FIG. 7 shows change of reflection ratio in accordance with wavelength change of light on condition that $\Theta1$ is 15 and $\Theta2$ is 75, similar to the optical apparatus shown in FIG. 3.

Figure 8:
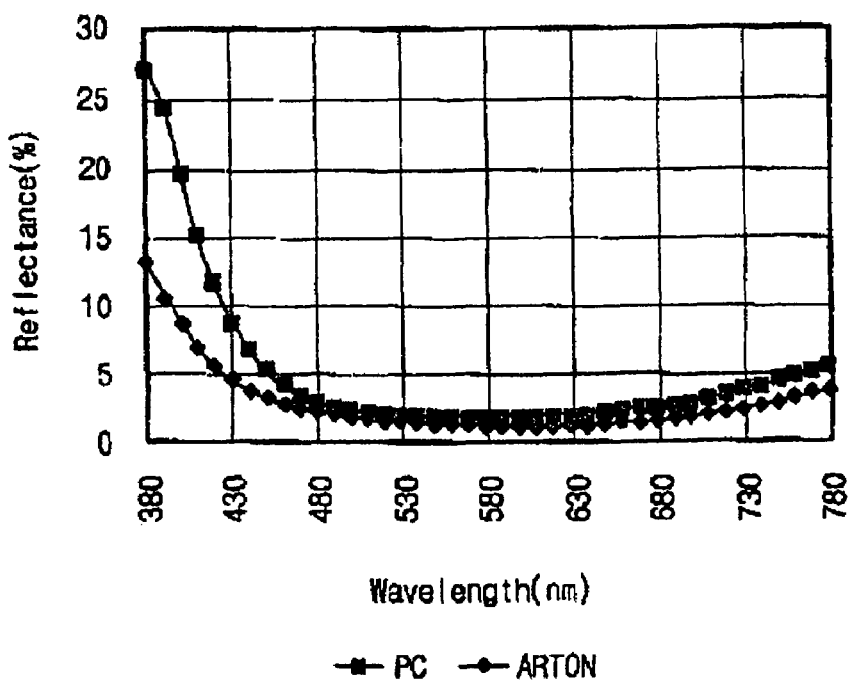
FIG. 8 is a graph showing result of a real experiment using PC and ARTON, in the real experiment, the $\Theta 1$ and $\Theta 2$ is selected from the conditions of TABLE 1.

FIG. 8 is a graph showing the result of a real experiment using PC and ARTON. In the real experiment, the $\Theta1$ and $\Theta2$ is selected from the conditions of the "TABLE 1".

By comparing the FIG. 7 with FIG. 8, it is confirmed that the simulation result corresponds to the result of real experiment in a range of the visible light except the range below 480 nm. In a range of wavelength below 480 nm, ARTON shows better dispersion characteristics and seems to be preferable as a retardation film.

The following "TABLE 2" indicates optical characteristics of the invention in comparison with a prior art adopting a conventional retardation film. By applying the value pairs to $\Theta1$ and $\Theta2$ of the "TABLE 1", reflection ratio of light in a white mode is improved as much as 10% in a reflection type TFT liquid crystal display having an ARTON retardation film. In a dark mode, the reflection ratio of light in the liquid crystal display is reduced as much as a half level. In the invention, thus, the ARTON retardation film is utilized to improve the contrast ratio as much as 100%, and a PC retardation film is utilized to improve the contrast ratio as much as 50%. In the "TABLE 2", specific values correspond to ratios of a value to $BaSO_4$.

TABLE 2

| MATERIALS | WHITE MODE (%) | DARK MODE (%) | CONTRAST RATIO |
|---|---|---|---|
| PC (PRIOR ART) | 25.08 | 1.01 | 24.83 |
| PC | 26.44 | 0.74 | 35.73 |
| ARTON | 27.15 | 0.55 | 49.36 |

Figure 9:
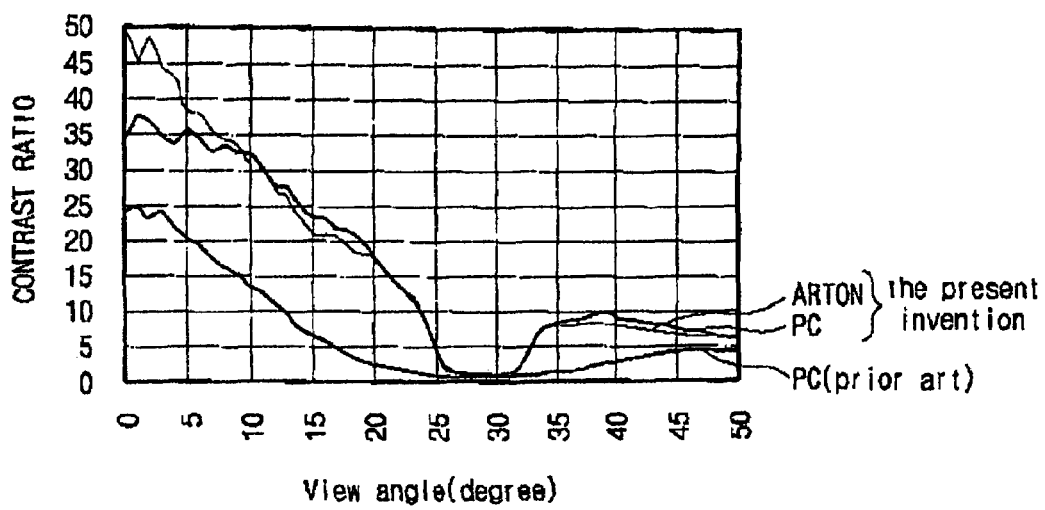
FIG. 9 shows variation of contrast ratio in accordance with change of a viewing angle in a liquid crystal display panel.
Figure 10:
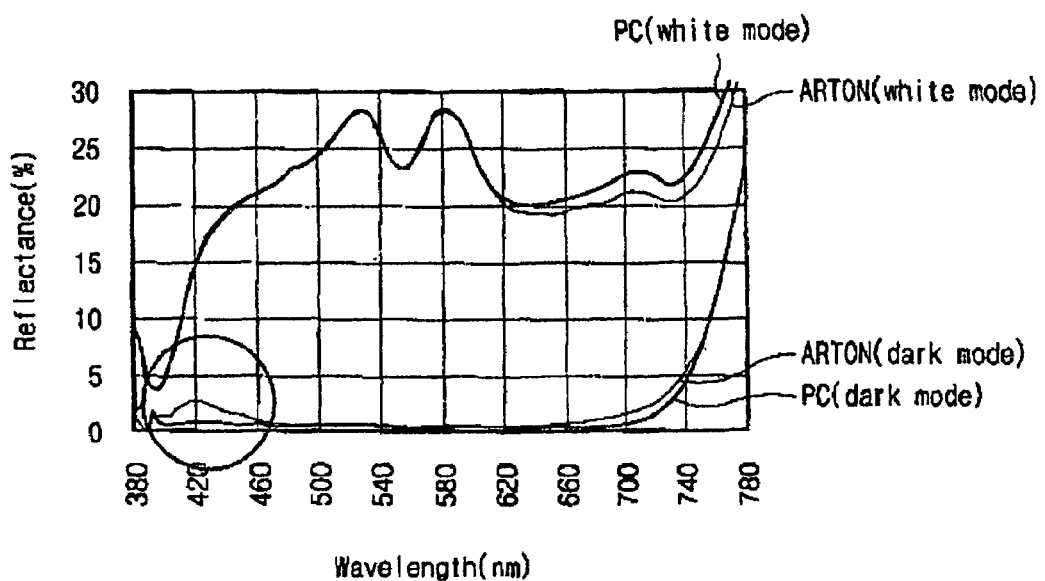
FIG. 10 is a graph showing variation of reflection ratio to some materials in accordance with wavelength change.

FIG. 9 shows variation of contrast ratio in accordance with change of a viewing angle in a liquid crystal display panel, and FIG. 10 is a graph showing variation of reflection ratio to some materials in accordance with wavelength change. The values of reflection ratio are measured by a spectrum analyzer. Referring to the materials composing a retardation film, there is no distinct difference of the reflection ratio in a white mode. However, in a dark mode, the reflection ratio becomes different in accordance with the materials. Especially, in a range of 480 nm and less, the reflection ratios reveal distinct differences.

On the contrary to expectation, in FIG. 9, reflection ratio of a liquid crystal display using a PC retardation film decreases because the polarizer is treated by chemicals for shielding ultraviolet.

Embodiment 2

Embodiment 2 is related to a reflective-transmissive type liquid crystal display.

Figure 11:
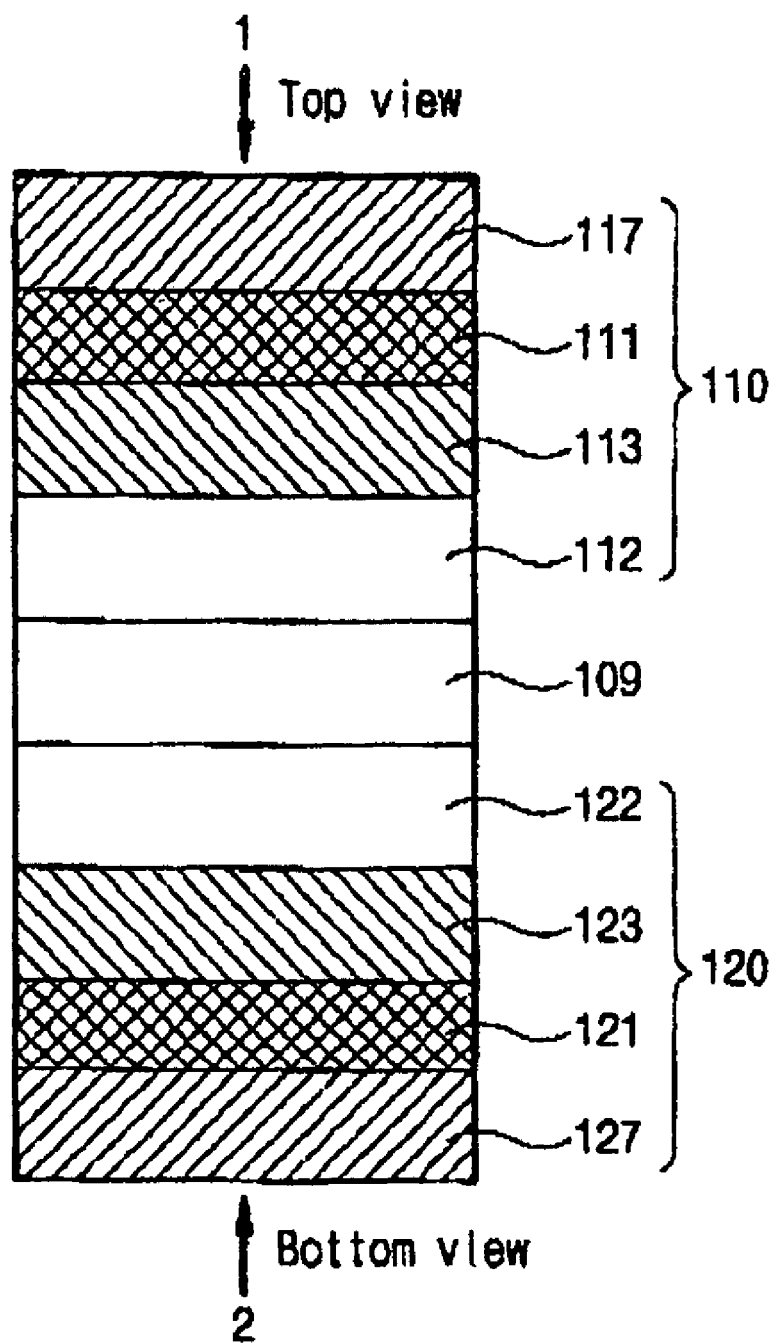
FIG. 11 is a cross-sectional view of a transmissive region.
Figure 12:
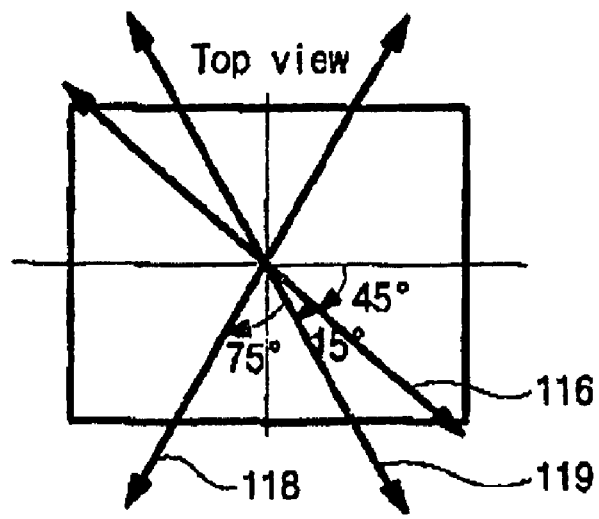
FIG. 12 and FIG. 13 are plane views from a top and a bottom of FIG. 11, respectively.
Figure 13:
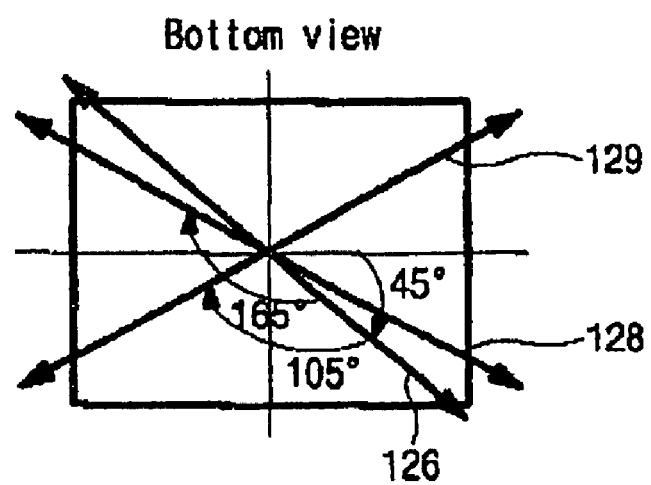

A part of a pixel is a transmissive region and the other is a reflective region. FIG. 11, showing an example of a reflective-transmissive type liquid crystal display panel or a transmissive type liquid crystal display panel, is a cross-sectional view of the transmissive region. FIG. 12 and FIG. 13 are plane views from a top and from a bottom of FIG. 11, respectively. The axis arrangement of polarizers and retardation films adopts combination 2 in the following "TABLE 3".

Polarizers 117 and 127 attached in an upper and a lower panel glasses 112 and 122 are arranged, so that two transmissive axes are at a right angle each other. A liquid crystal layer 109 is placed between the upper and the lower panel glasses 112 and 122.

With regard to the upper panel plate 110, a quarter lambda retardation film 113, a half lambda retardation film 111, and a polarizer 117 are sequentially attached to an outer side of a substrate glass 112. In this case, $\Theta 1$ is an angle between the transmissive axis 116 of the polarizer 117 and the slow axis 118 of half lambda retardation film 111, and $\Theta 2$ is an angle between the transmissive axis 116 of the polarizer 117 and the slow axis 119 of quarter lambda retardation film 113. $\Theta 2$ is selected by the relation equation $\Theta 2 = 2 \times \Theta 1 \pm 45°$.

With regard to a lower panel plate 120, a quarter lambda retardation film 123, a half lambda retardation film 121 and a polarizer 127 are sequentially attached to an outer side of a substrate glass 122. In this case, $\Theta 4$ is an angle between the transmissive axis 126 of the polarizer 127 and the slow axis 128 of the half lambda retardation film 121, and $\Theta 3$ is an angle between the transmissive axis 126 of the polarizer 127 and the slow axis 129 of quarter lambda retardation film 123. $\Theta 3$ is selected by the relation equation $\Theta 3 = 2 \times \Theta 4 \pm 45°$. Therefore, incident light to the upper panel plate 110 from a top point is transformed to clockwise circularly polarized light and incident light to lower panel plate 120 from the bottom point is transformed to clockwise circularly or counterclockwise circularly polarized light.

The following "TABLE 3" is combination of $\Theta 1$, $\Theta 2$, $\Theta 3$ and $\Theta 4$ which can maximize contrast of a transmissive type liquid crystal display panel in a wide wavelength range of visible light.

As is shown in "TABLE 3", considering the polarizers and retardation films, a panel structure of a liquid crystal display is symmetric so that an upper plate and a lower plate of the liquid crystal display can be transposed or turned over without any difference in transmittance of light. And, because the turnover of any axis makes no difference in the arranged liquid crystal display panel, a value of 180 can be added to or distracted from each of the angle values.

Preferably, thickness of liquid crystal is decided so that the liquid crystal display panel can be in its white mode when an electric field is not applied to a liquid layer.

TABLE 3

| Division | Angle | Combination 1 | Combination 2 | Combination 3 | Combination 4 |
|---|---|---|---|---|---|
| Upper film (top view) | $\Theta 1$ | 15°0 | 75 | 105 | 165 |
|  | $\Theta 2$ | 75 | 15 | 165 | 105 |
| lower film (bottom view) | $\Theta 3$ | 165 | 105 | 75 | 15 |
|  | $\Theta 4$ | 105 | 165 | 15 | 75 |

The upper panel plate 110 is formed so that the incident light to the upper panel plate 110 from the top point is transformed to clockwise circularly polarized light and the incident light to lower panel plate from the bottom point is transformed to clockwise circularly polarized light from the top view. Let the thickness of the liquid crystal layer 109 correspond to a half of wavelength of visible light and the transmissive axes 116 and 126 of the upper and the lower polarizers 117 and 127 are perpendicular to each other.

Incident light from a top passes the upper panel plate 110 and is transformed to clockwise circularly polarized light. If an electric field is not applied to the liquid crystal layer 109, the clockwise circularly polarized light is changed into counterclockwise circularly polarized light. With passage of the lower retardation plate composed of two element retardation films 121 and 123, the counterclockwise circularly polarized light is transformed to linearly polarized light. The direction of vibration is perpendicular to the transmissive axis 116 of the upper polarizer 117. By the action of the lower polarizer 127 whose transmissive axis is perpendicular to that of the upper polarizer 117, the whole part of the linearly polarized light may pass the polarizer and make a white mode.

However, if an electric field is applied to the liquid crystal 109, the clockwise circularly polarized light does not change and remain as clockwise circularly polarized light. With passage of the lower retardation film composed of two element retardation films 121 and 123, the clockwise circularly polarized light is transformed to linearly polarized light. But, the direction of vibration is parallel to the transmissive axis 116 of the upper polarizer 117. By the action of the lower polarizer 127 whose transmissive axis 126 is perpendicular to the transmissive axis 116 of upper polarizer 117, the whole part of the linearly polarized light cannot pass the lower polarizer 127 and make a dark mode.

If the axis of upper polarizer is parallel to the axis of lower polarizer, the white and the dark modes will be turned. If thickness of the liquid crystal layer corresponds to a quarter of a wavelength, light intensity in the white mode shall be diminished by the action of lower polarizer. In other words, before the lower polarizer, a state of the light is circularly polarized and some part of the circularly polarized light cannot transmit the lower polarizer. But, in a reflective type, it is preferable that thickness of the liquid crystal layer corresponds to a quarter of the wavelength.

Thus, the thickness of the liquid crystal layer in a transmissive part of the liquid crystal display is to correspond to a half of the wavelength and that in a reflective part of the liquid crystal display is to correspond to a quarter of the wavelength.

The structure having two different cell gaps in the pixel may be obtained by partial or regional removal of a thickness organic insulating layer in a pixel region.

Figure 14:
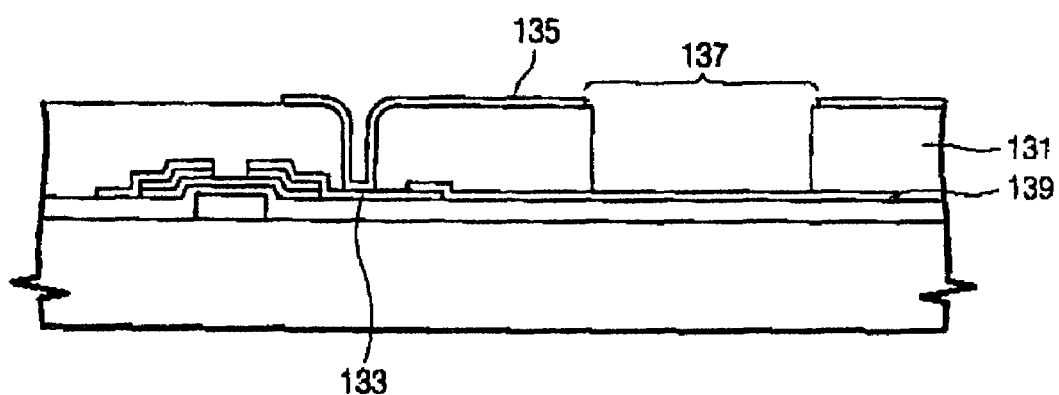
FIG. 14 is an example of a structure having two different cell gaps in a pixel of a liquid crystal display.

For example, as shown in FIG. 14, the organic insulation layer 131 is insulation layer generally formed between the source electrode 133 of thin film transistor and reflection electrode 135. A region deprived of the organic insulating layer 131 forms a transmissive part 137 and is covered with transparent conductive material 139 connected to a source electrode 133. The other part is a reflective part having a reflector, the reflection electrode 135 and the thickness correspond to a quarter of wavelength. Although the thickness of the organic insulating layer 131 deprived from the transmissive part 137 is smaller than length corresponding to a quarter of the wavelength, intensity of transmitted light may be strengthened as much as that.

According to the invention, it is possible that a retardation film becomes an efficient quarter lambda plate throughout a wide range of visible light. Therefore, in the wide range thereof, light intensity of a display in a dark state can be reduced to considerably improve contrast ratio of a liquid crystal display.

While the invention has been described in terms of its preferred embodiments, those skilled in the art will recognize that the invention can be practiced with modification within the spirit and scope of the appended claims.

What is claimed is:

1. A liquid crystal display comprising:
   a first substrate glass;
   a second substrate glass;
   a liquid crystal layer between the first substrate glass and the second substrate glass;
   a first polarizer placed on an outer side of the first substrate glass, the outer side being opposite to a liquid crystal layer;
   a first quarter wavelength retardation plate arranged between the first substrate glass and the first polarizer, the first quarter wavelength retardation plate comprising:
      a first half wavelength retardation film, being adjacent to the first polarizer, of a predetermined wavelength, wherein a slow axis thereof makes a specific angle of $\Theta 1$ with a transmissive axis of the first polarizer; and
      a first quarter wavelength retardation film adjacent to the first substrate glass wherein a slow axis thereof makes a specific angle of $\Theta 2$ with the transmissive axis of the first polarizer in accordance with relation equation of $\Theta 2 = 2 \times \Theta 1 \pm 45$ degrees;
   a second polarizer placed on an outer side of the second substrate glass, the outer side being opposite to the liquid crystal layer; and
   a second quarter wavelength retardation plate arranged between the second substrate glass and the second polarizer, the second quarter wavelength retardation plate comprising:
      a second half wavelength retardation film, being adjacent to the second polarizer, of the predetermined wavelength, wherein a slow axis thereof makes a specific angle of $\Theta 4$ with a transmissive axis of the second polarizer; and
      a second quarter wavelength retardation film adjacent to the second substrate glass, wherein a slow axis thereof makes a specific angle of $\Theta 3$ with the transmissive axis of the second polarizer in accordance with the relation equation of $\Theta 3 = 2 \times \Theta 4 \pm 45$ degrees,
   wherein a display region of the liquid crystal display is divided into a reflective region and a transmissive region,
   wherein in the reflective region, the effective light path difference $\Delta nd$ of the liquid crystal layer is equal to a quarter of the predetermined wavelength and a reflector is placed on the inner side of the second substrate glass,
   wherein in the transmissive region, the effective light path difference $\Delta nd$ of the liquid crystal layer is equal to a half of the predetermined wavelength, and
   wherein the relation equations $\Theta 2 = (2 \times \Theta 1) \pm 45$ and $\Theta 3 = (2 \times \Theta 4) \pm 45$ obtain for the reflective region and the transmissive region.

2. The liquid crystal display of claim 1, wherein the predetermined wavelength is 5500 Å.

3. The liquid crystal display of claim 1, wherein the effective light path difference $\Delta nd$ of the liquid crystal layer is equal to a quarter of the predetermined wavelength and a reflector is placed on an inner side of the second substrate glass.

4. The liquid crystal display of claim 1, wherein the specific angle $\Theta 1$ is one selected from a group consisting of degree values (15, 75, 105, and 165) with limit to an error of 5 degrees and the specific angle $\Theta 2$ is decided by relation equation of $\Theta 2 = 2 \times \Theta 1 + +45$ degree.

5. The liquid crystal display of claim 1, wherein the retardation films are single-axial films.

6. The liquid crystal display of claim 1, wherein the effective light path difference $\Delta nd$ of the liquid crystal layer is equal to a half of the predetermined wavelength.

7. The liquid crystal display of claim 1, wherein the transmissive axis of the first polarizer is perpendicular to the transmissive axis of the second polarizer.

8. The liquid crystal display of claim 1, wherein a combination of the values ($\Theta 1, \Theta 2, \Theta 3, \Theta 4$) is one selected from a group consisting of combinations (15, 75, 165, 105) and (105, 165, 75, 15).

9. The liquid crystal display of claim 1, wherein the display region is made of pixels having a thin film transistor and a region of the respective pixels is divided into the reflective region and the transmissive region.

10. The liquid crystal display of claim 1, wherein the thickness of the liquid crystal layer is controlled by regional thickness of an organic insulating layer.

* * * * *